(12) United States Patent
Fairchild

(10) Patent No.: US 12,280,850 B2
(45) Date of Patent: Apr. 22, 2025

(54) BICYCLE TETHERING SYSTEM

(71) Applicant: Tim Fairchild, Milford, IA (US)

(72) Inventor: Tim Fairchild, Milford, IA (US)

( * ) Notice: Subject to any disclaimer, the term of this patent is extended or adjusted under 35 U.S.C. 154(b) by 619 days.

(21) Appl. No.: 17/696,156

(22) Filed: Mar. 16, 2022

(65) Prior Publication Data

US 2022/0297788 A1   Sep. 22, 2022

Related U.S. Application Data

(60) Provisional application No. 63/162,218, filed on Mar. 17, 2021.

(51) Int. Cl.
*B62K 19/30* (2006.01)
*B60D 1/36* (2006.01)

(52) U.S. Cl.
CPC .................................. *B62K 19/30* (2013.01)

(58) Field of Classification Search
CPC .... B60D 1/36; B60D 1/363; B60D 2001/003; B62K 27/12; B62K 27/14; B62K 27/003; B62K 13/06; B62K 13/025
USPC ...................... 280/477, 204, 292; 403/DIG. 1
See application file for complete search history.

(56) References Cited

U.S. PATENT DOCUMENTS

| | | | |
|---|---|---|---|
| 3,150,884 A * | 9/1964 | Drott | B60D 1/06 37/231 |
| 4,178,011 A | 12/1979 | Kirsch | |
| 4,261,592 A | 4/1981 | Busseull | |
| 5,749,592 A | 5/1998 | Marchetto | |
| 5,941,551 A * | 8/1999 | Harman | B60D 1/02 280/477 |
| 6,036,215 A * | 3/2000 | Bruner | B62K 13/08 280/240 |
| 6,286,847 B1 | 9/2001 | Perrin | |
| 6,350,076 B1 * | 2/2002 | Wagner | F16C 11/106 403/56 |
| 6,983,947 B2 | 1/2006 | Asbury | |
| 7,766,358 B1 | 8/2010 | Phillips | |
| 8,047,559 B2 * | 11/2011 | Harlin | B60D 1/58 280/477 |
| 8,202,017 B2 * | 6/2012 | Shalaby | B62K 27/12 24/270 |
| 8,286,920 B2 | 10/2012 | Bogg | |
| 8,672,575 B2 * | 3/2014 | McMurtry | B25J 17/0216 403/122 |
| 8,733,719 B2 * | 5/2014 | Gaal | F16B 7/0433 280/292 |
| 9,725,126 B2 | 8/2017 | Yeh | |
| 10,556,473 B2 * | 2/2020 | Strand | B60D 1/62 |
| 2008/0303239 A1 * | 12/2008 | Underhaug | B62H 7/00 280/204 |
| 2016/0023712 A1 * | 1/2016 | Petit-Frere | B62K 13/025 29/428 |

(Continued)

*Primary Examiner* — Anne Marie M Boehler

(57) ABSTRACT

A vehicle tethering device includes a lead support configured for coupling to a lead vehicle, a trailing support configured for coupling to a trailing vehicle, a lead connector coupled to the lead support, and a trailing connector coupled to the trailing support. The lead connector is engageable to the trailing connector to form a junction transferring force between the lead connector and the trailing connector through the junction to permit a pulling force to be applied to the trailing vehicle from the lead vehicle.

15 Claims, 10 Drawing Sheets

(56) References Cited

U.S. PATENT DOCUMENTS

| | | |
|---|---|---|
| 2019/0055032 A1 | 2/2019 | Thornton |
| 2019/0351968 A1* | 11/2019 | Olszewski ........... B62K 13/025 |

* cited by examiner

BICYCLE TETHERING SYSTEM

CROSS-REFERENCE TO RELATED APPLICATIONS

I hereby claim the benefit under 35 U.S.C. Section 119(e) of U.S. Provisional application 62/162,218 filed Mar. 17, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tethering device and more particularly pertains to a new tethering device for tethering a lead vehicle to a trailing vehicle while both are in motion.

(2) Description of Related Art Including Information Disclosed Under 37 CFR 1.97 and 1.98

The prior art relates to tethering devices. Generally, known devices for tethering one vehicle to another require stopping of the vehicles and manual connection of a tethering device such as a chain, pole, line, strap, frame, or the like.

BRIEF SUMMARY OF THE INVENTION

An embodiment of the disclosure meets the needs presented above by generally comprising a lead support configured for coupling to a lead vehicle, a trailing support configured for coupling to a trailing vehicle, a lead connector coupled to the lead support, and a trailing connector coupled to the trailing support. The lead connector is engageable to the trailing connector to form a junction transferring force between the lead connector and the trailing connector through the junction to permit a pulling force to be applied to the trailing vehicle from the lead vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
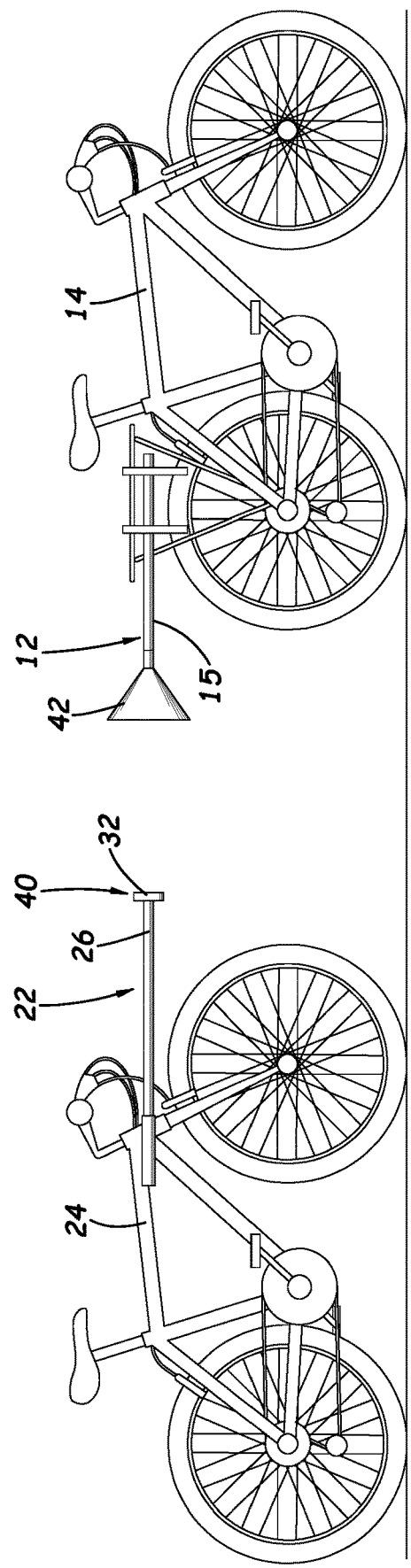
FIG. 1 is a side view of a vehicle tethering device according to an embodiment of the disclosure in a disengaged position.
Figure 2:
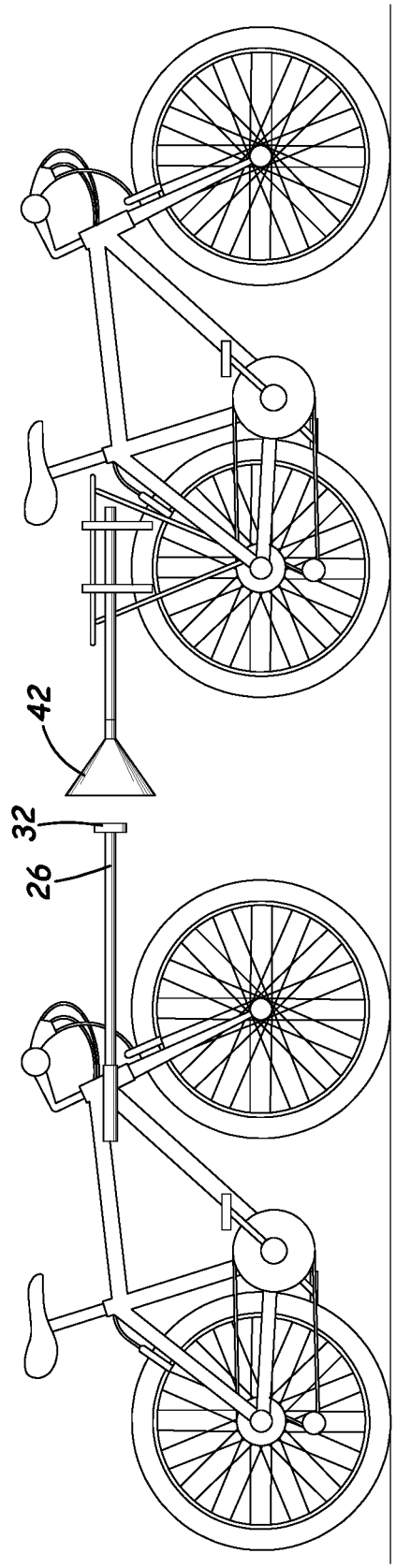
FIG. 2 is a side view of an embodiment of the disclosure approaching engagement.
Figure 3:
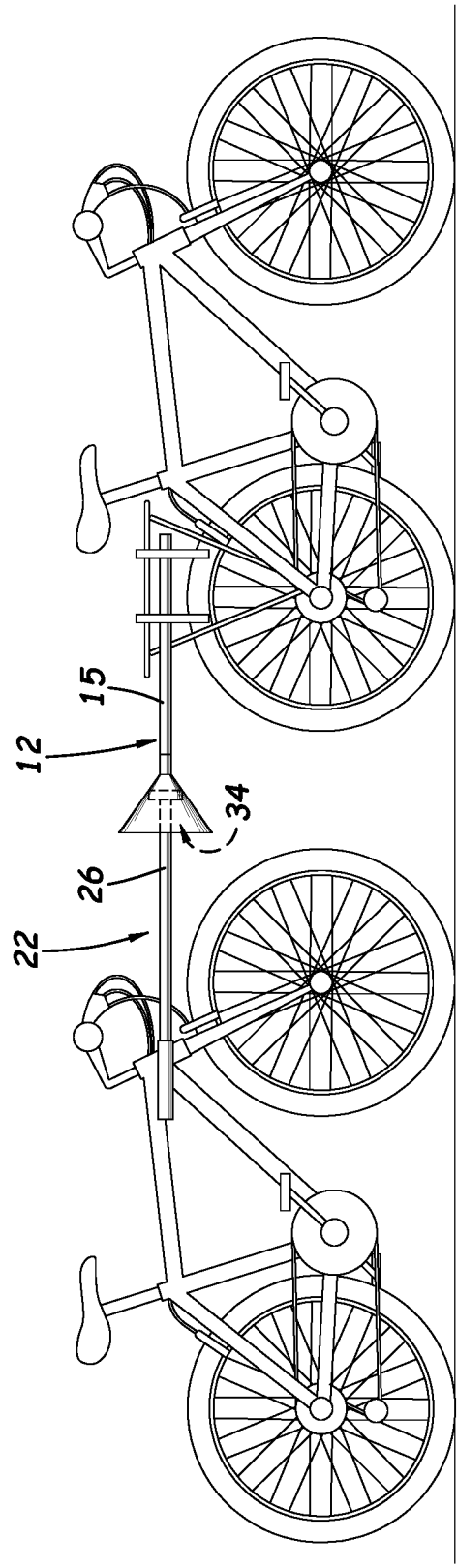
FIG. 3 is a side view of an embodiment of the disclosure in an engaged position.
Figure 4:
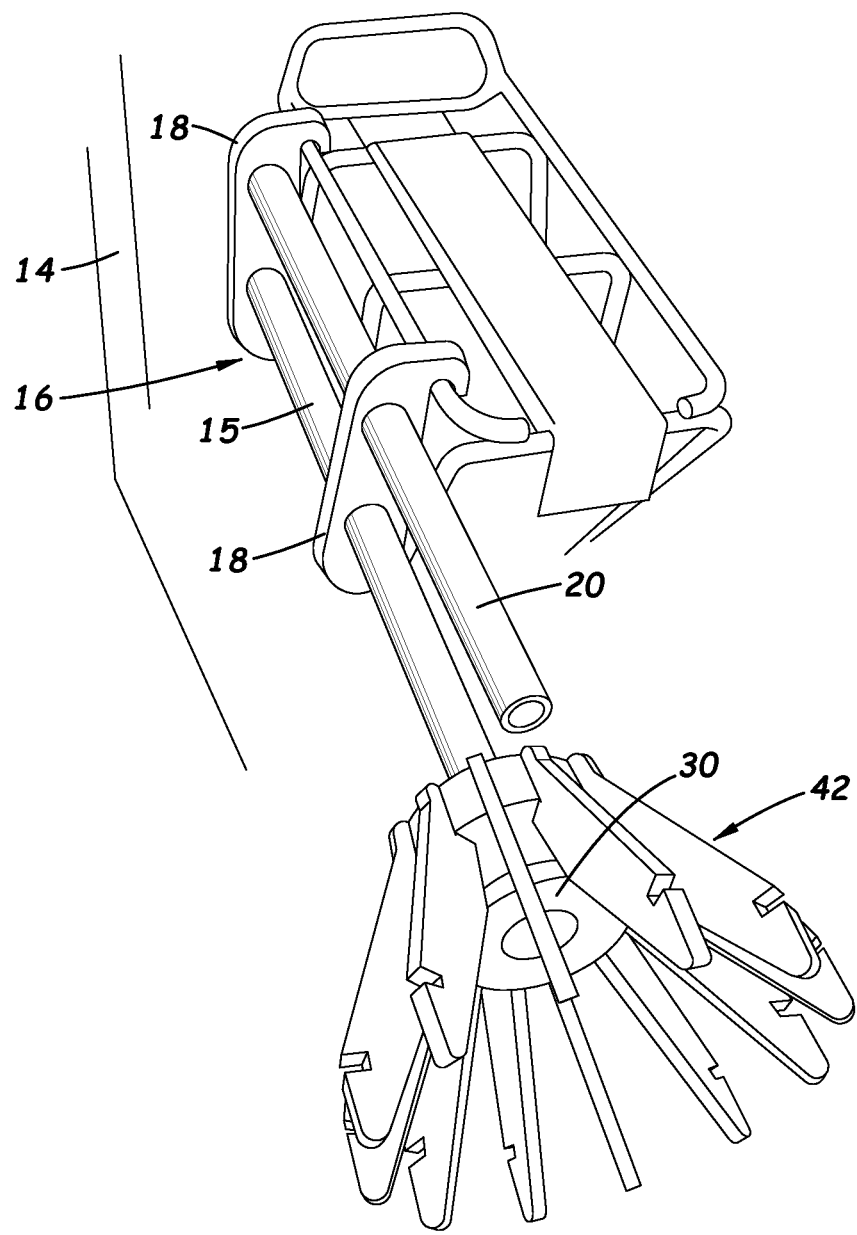
FIG. 4 is a perspective view of an embodiment of the disclosure on a lead vehicle.
Figure 5:
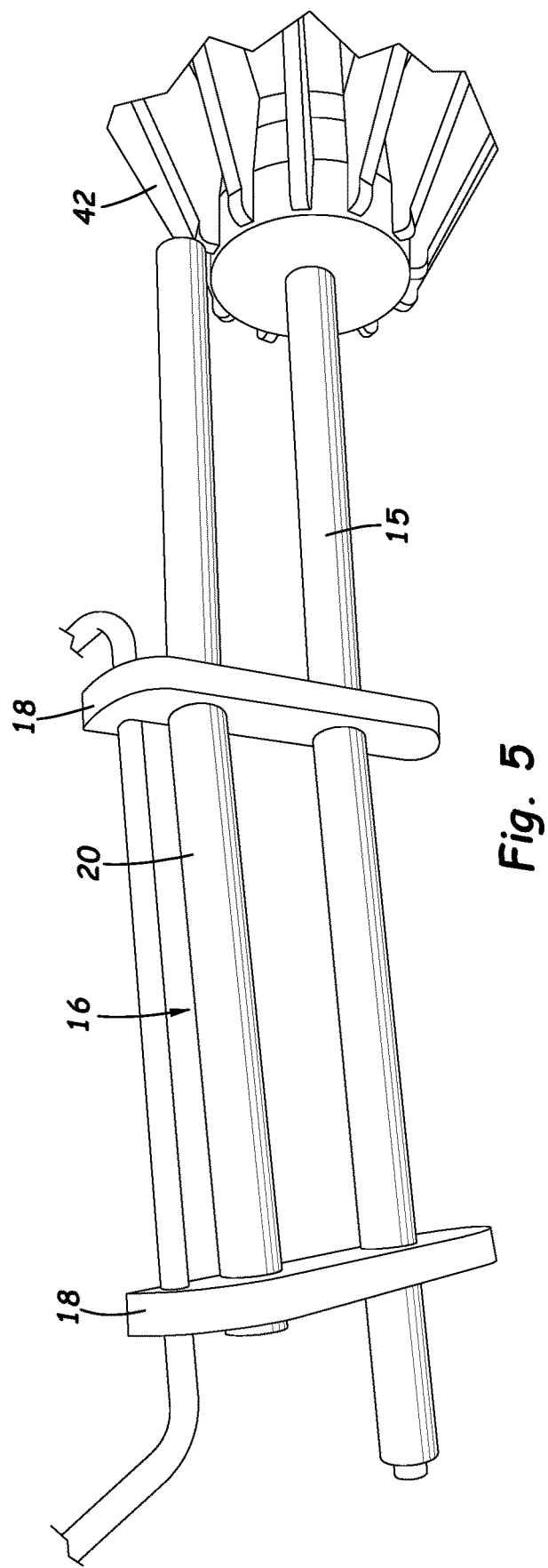
FIG. 5 is a side view of an embodiment of the disclosure on a lead vehicle.
Figure 6:
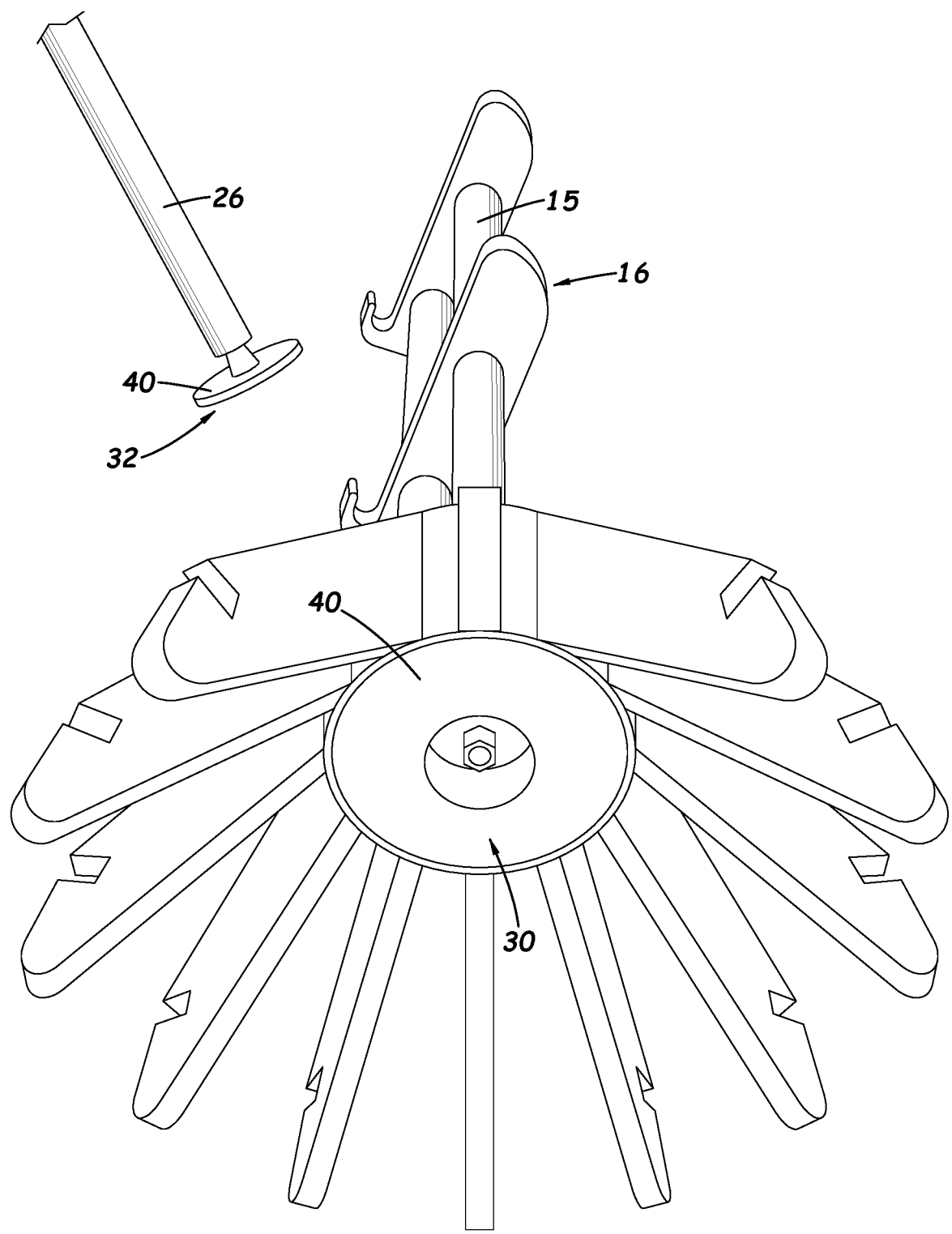
FIG. 6 is a perspective view of an embodiment of the disclosure for attachment to a lead vehicle.
Figure 7:
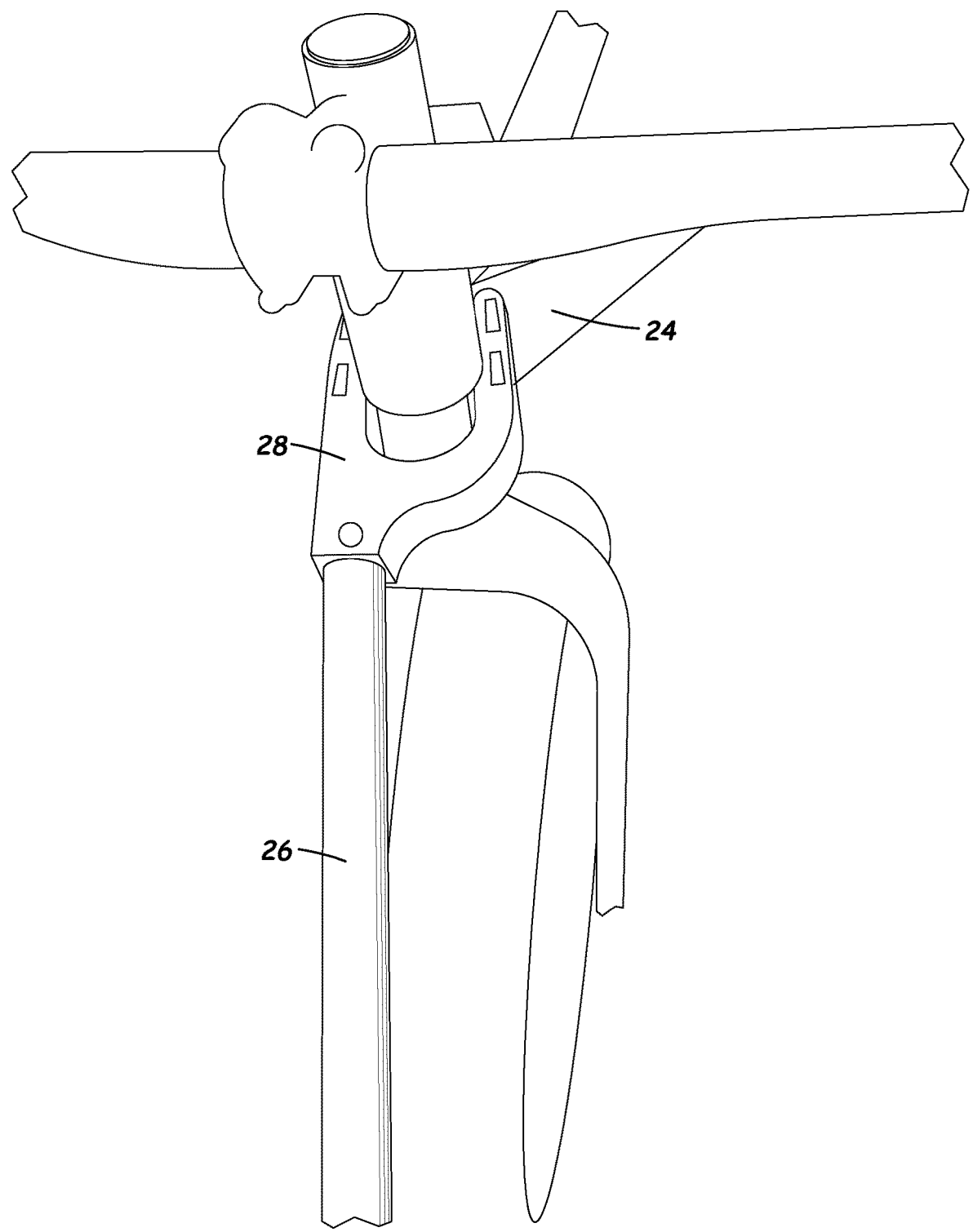
FIG. 7 is a perspective view of an embodiment of the disclosure attached to a trailing vehicle.
Figure 8:
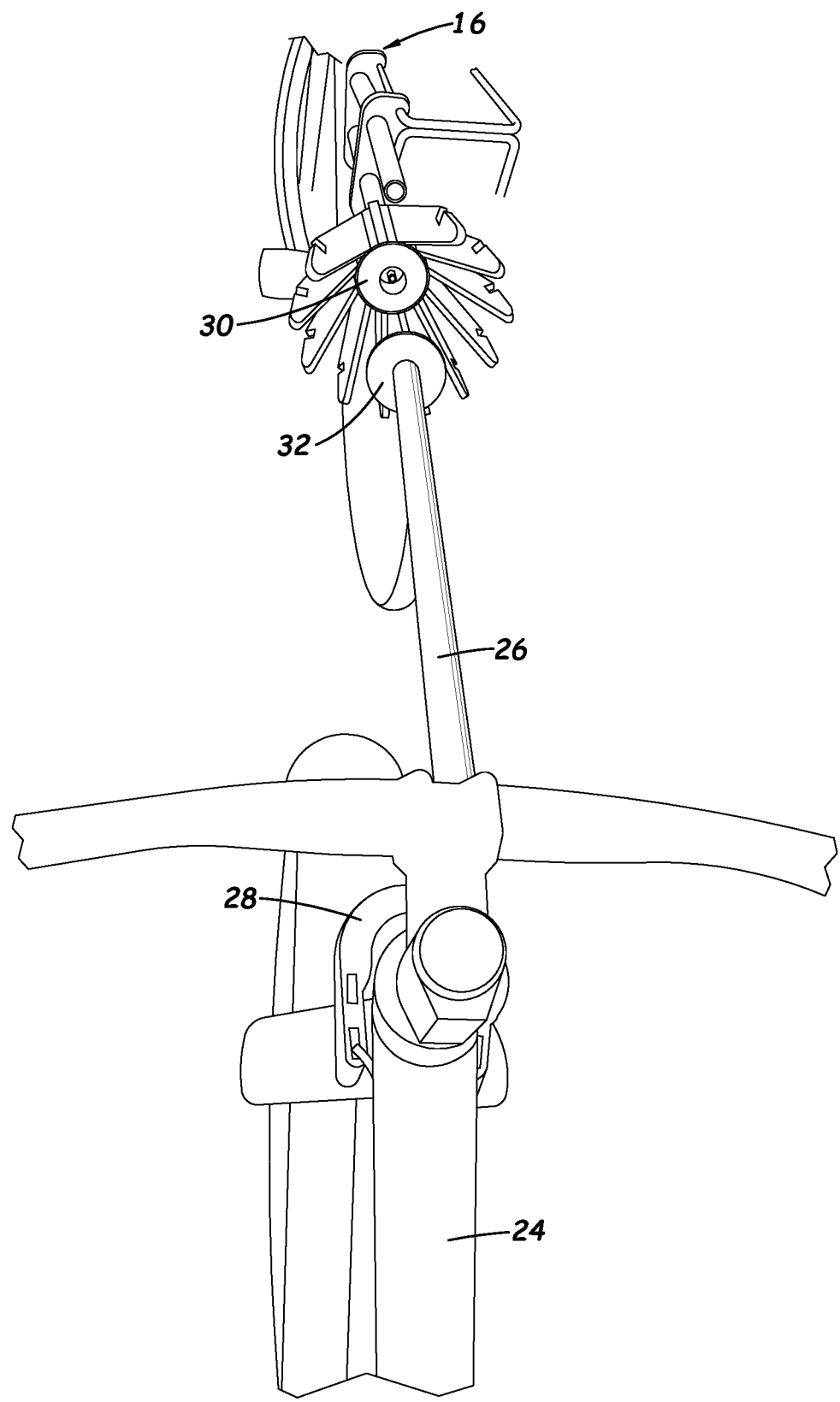
FIG. 8 is a rear view of an embodiment of the disclosure in a disengaged position.
Figure 9:
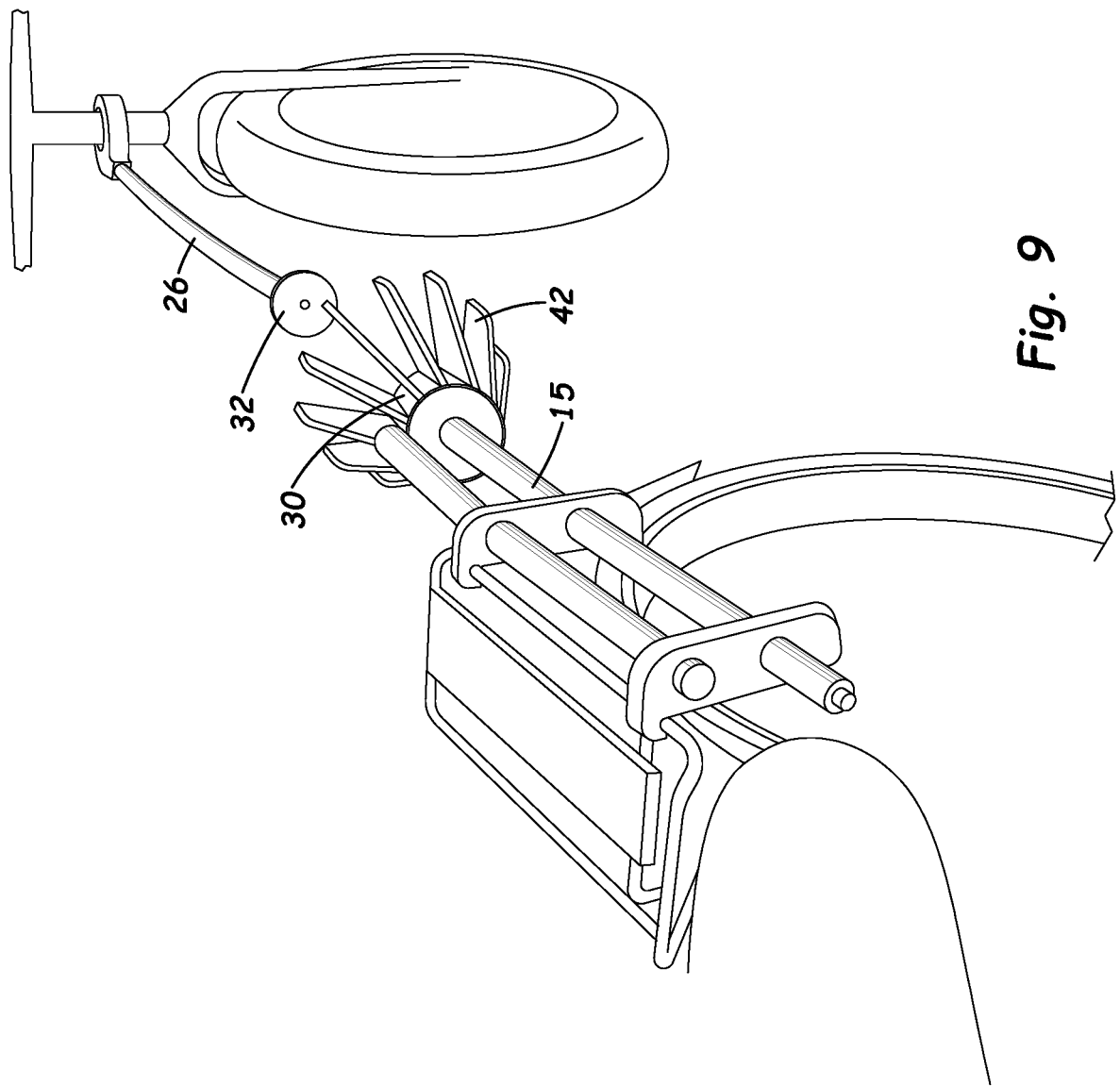
FIG. 9 is a front perspective view of an embodiment of the disclosure in a disengaged position.

With reference now to the drawings, and in particular to FIGS. 1 through 10 thereof, a new tethering device embodying the principles and concepts of an embodiment of the disclosure and generally designated by the reference numeral 10 will be described.

As best illustrated in FIGS. 1 through 10, the vehicle tethering device 10 generally comprises a lead support 12 configured for coupling to a lead vehicle 14 such that the lead support 12 extends rearwardly from the lead vehicle 14. The lead support 12 may be a lead pole 15 constructed of PVC pipe, metal, plastic, or the like to provide sufficient stiffness to prevent substantial sagging. The lead support 12 is secured to the lead vehicle by a bracket assembly 16 or the like. The bracket assembly 16 may utilize two spaced vertical brackets 18 connected to the lead pole 15. A brace 20 may be connected between the brackets 18. The bracket assembly 16 may be attached to a fender, luggage rack, or similar structure fixed to the lead vehicle 14. The bracket assembly 16 may be offset from a central axis of the lead vehicle along a direction of travel to facilitate viewing of the lead support 12 by a person controlling the lead vehicle 14.

A trailing support 22 is configured for coupling to a trailing vehicle 24 such that the trailing support 22 extends forwardly from the trailing vehicle 24. The trailing support 22 may be a trailing pole 26 of similar construction to the lead pole 15. While the invention is conceived to apply to other types of vehicles, the lead vehicle 14 and trailing vehicle 24 may be bicycles or similar pedal vehicles. The invention equally applies to electric vehicles wherein battery power may be an issue such that the trailing vehicle 24 needs assistance to move at a desired speed. The trailing pole 26 may be connected to a front neck of a bicycle frame adjacent to the handlebars by a conventional collar attachment 28. A lead connector 30 is coupled to the lead support 12. A trailing connector 32 is coupled to the trailing support 22. The lead connector 30 is engageable to the trailing connector 32 to form a junction 34 whereby force is transferred between the lead connector 30 and the trailing connector 32 through the junction 34. Thus, the junction 34 is configured to provide a pulling force to the trailing vehicle 24 from the lead vehicle 14. The lead support 12 has a length sufficient to position the lead connector 30 rearwardly of a back of the lead vehicle 14. The trailing support 22 has a length sufficient to position the trailing connector 32 forwardly of a front of the trailing vehicle 24 to inhibit contact between the lead vehicle 14 and the trailing vehicle 24.

While a suitable mechanical connection may be achieved through various conventional connectors, it is conceived that the lead connector 30 and trailing connector 32 each comprise respective magnets 40. Each of the respective magnets 40 may be disc shaped having a circular outer perimeter. The respective magnets 40 allow for disengagement from each other at a threshold force level. The threshold force level may be one which allows for towing of the trailing vehicle 24 while a rider of the trailing vehicle 24 is providing motive force to the trailing vehicle 24, or when no assistance is being provided wherein the lead vehicle 14 is essentially fully towing the trailing vehicle 24. The threshold force level may be achieved by the rider of the trailing vehicle 24 applying braking force sufficient to provide separation of the magnets 40. Further, the threshold force level may be such that it is exceeded in the event of erratic movements such as crashing of either the lead vehicle 14 or the trailing vehicle 24. The specific level of attraction between the magnets 40 may be determined according to preference and may be adjusted by selection of magnets 40 providing a desired amount of attraction to each other.

A guide 42 is coupled to one of the lead support 12 and the trailing support 22. The guide 42 extends outwardly and away from the one of the lead support 12 and the trailing support 22 wherein the guide 42 is positioned to facilitate alignment and engagement of the lead connector 30 to the trailing connector 32. It is contemplated that the guide 42 being coupled to the lead support 12 facilitates alignment and connection of the magnets 40 as the rider of the trailing vehicle will be able to see into the guide 42 while approaching the lead vehicle 14. The guide 42 may be a solid and continuous wall forming a funnel shape as shown in some of the provided figures, or may comprise a plurality of spaced ribs arranged into a funnel configuration as shown in other provided figures.

Figure 10:
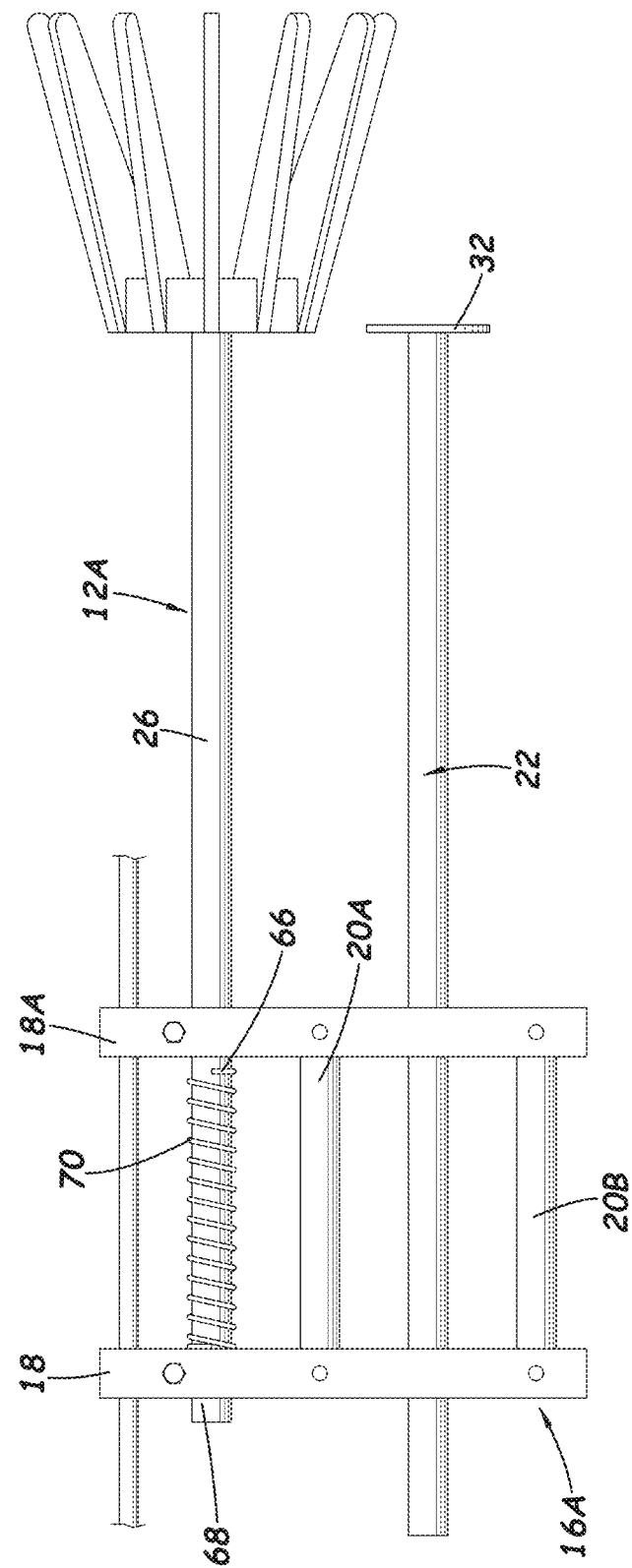
FIG. 10 is a front perspective view of an embodiment of the disclosure in a disengaged position.

As shown in FIG. 10, the bracket assembly 16A may include spaced brackets 18A and a first brace 20A similar to bracket assembly 16. The trailing support 22 may be removable coupled to the brackets 18A and secured using set screws, cotter pin, or a similar conventional fastener. A second brace 20B may be coupled to and extend between the brackets 18A. A lead support 12A may be slidably extended through the brackets 18A and retained by a butt plate 68 and stop 66. The lead support 12A may extend through a biasing member 70 positioned between one of the brackets 18A and the stop 66 such that the biasing member 70 dampens force transferred to the leading vehicle 14 when the trailing connector 32 contacts the lead connector 30. While the trailing support 22 is shown stored using the bracket assembly 16A, it is contemplated that the storage of the trailing support 22 may be provided with bracket assembly 16 without having to include the other elements of the invention shown in FIG. 10 such as the biasing member 70 and slidable lead support 12A.

In use, the lead connector 30 and trailing connector 32 are engageable while the lead vehicle 14 and trailing vehicle 24 are in motion. Further, the threshold force level may be exceeded either intentionally or unintentionally to separate the male connector 30 from the female connector 32. This may be achieved intentionally while both the lead vehicle 14 and trailing vehicle 24 are in motion. The invention allows for a rider on the lead vehicle 14, having greater endurance than the rider on the trailing vehicle 24, to assist the rider of the trailing vehicle 24 to continue moving at a greater speed than would be possible unassisted. The manner of operation allows for ease of use such that the device 10 may be used by an adult and child wherein the child may receive assistance climbing hills or be allowed assistance or even a respite from pedaling during an extended journey.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle tethering system comprising:
   a lead support configured for coupling to a lead vehicle such that the lead support extends rearwardly from the lead vehicle;
   a trailing support configured for coupling to a trailing vehicle such that the trailing support extends forwardly from the trailing vehicle;
   a lead connector coupled to the lead support;
   a trailing connector coupled to the trailing support; and
   wherein the lead connector is engageable to the trailing connector to form a junction whereby force is transferred between the lead connector and the trailing connector through the junction wherein the junction is configured to provide a pulling force to the trailing vehicle from the lead vehicle;
   a guide coupled to one of the lead support and the trailing support, the guide extending outwardly and away from the one of the lead support and the trailing support wherein the guide is positioned to facilitate alignment and engagement of the lead connector to the trailing connector, wherein the guide is coupled to the lead vehicle whereby the guide is configured to be viewed by a person controlling the trailing vehicle, the guide being a plurality of spaced ribs, the plurality of spaced ribs extending rearwardly from the lead connector and being arranged radially around the lead connector.

2. The system of claim 1 further comprising the lead connector and trailing connector each comprising respective magnets.

3. The system of claim 2 further comprising the respective magnets disengaging from each other at a threshold force level wherein the magnets are configured to disengage the lead vehicle from the trailing vehicle when the threshold force level is exceeded.

4. The system of claim 3, further comprising each of the respective magnets being removably attached wherein each of the respective magnets is replaceable whereby the threshold force level is selectable and adjustable by selection of strength of attraction between the respective magnets attached to the lead support and trailing support.

5. The system of claim 1, further comprising the guide being coupled to the lead support and extending outwardly around the lead connector.

6. The system of claim 1, wherein each of the lead support and the trailing support is constructed of one of polyvinyl chloride pipe, metal, and plastic.

7. The system of claim 1, further comprising a bracket assembly configured to be secured to the lead vehicle, the lead support being coupled to the bracket assembly whereby the bracket assembly is configured to couple the lead support to the lead vehicle.

8. The system of claim 7 wherein the bracket assembly comprises a pair of brackets, the pair of brackets being vertically oriented and spaced, the lead support being coupled to and extending between the pair of brackets, the lead support further extending rearwardly from the pair of brackets.

9. The system of claim 8, further comprising a brace coupled to and extending between the pair of brackets.

10. The system of claim 7, further comprising the bracket assembly being configured to couple to the lead vehicle such that the bracket assembly is positioned offset from a central axis of the lead vehicle along a direction of travel wherein the bracket assembly is configured to facilitate viewing of the lead support by a person controlling the lead vehicle.

11. The system of claim 7, further comprising the trailing support being removably couplable to the bracket assembly.

12. The system of claim 1, further comprising a collar attachment configured for being secured to a front neck of the trailing vehicle, the trailing support being coupled to and extending forwardly from the collar attachment.

13. The system of claim 1, further comprising inwardly facing surface of the plurality of spaced ribs forming a funnel shape tapering inwardly towards the lead connector.

14. A vehicle tethering system comprising:
a lead support configured for coupling to a lead vehicle such that the lead support extends rearwardly from the lead vehicle;
a trailing support configured for coupling to a trailing vehicle such that the trailing support extends forwardly from the trailing vehicle;
a lead connector coupled to the lead support;
a trailing connector coupled to the trailing support;
wherein the lead connector is engageable to the trailing connector to form a junction whereby force is transferred between the lead connector and the trailing connector through the junction wherein the junction is configured to provide a pulling force to the trailing vehicle from the lead vehicle; and
a bracket assembly configured to be secured to the lead vehicle, the lead support being coupled to the bracket assembly whereby the bracket assembly is configured to couple the lead support to the lead vehicle, wherein the bracket assembly comprises
a pair of brackets, the pair of brackets being vertically oriented and spaced, the lead support being slidably coupled to and extending between the pair of brackets, the lead support further extending rearwardly from the pair of brackets,
a butt plate coupled to the lead support,
a stop coupled to the lead support, the stop being positioned between the pair of brackets wherein the butt plate and the stop retain the lead support to the bracket assembly, and
a biasing member, the lead support extending through the biasing member, the biasing member being positioned between one of the pair of brackets and the stop wherein the biasing member dampens force transferred to the leading vehicle when the trailing connector contacts the lead connector.

15. The system of claim 14, wherein the bracket assembly further comprises:
a first brace coupled to and extending between the pair of brackets; and
a second brace coupled to and extending between the pair of brackets.

* * * * *